Jan. 18, 1938.    F. GETTELMAN    2,105,767
PROCESS OF REMOVING COATING FROM CONTAINERS
Filed Aug. 20, 1934

INVENTOR
Fredrick Gettelman
BY Wheeler, Wheeler and Wheeler
ATTORNEYS

Patented Jan. 18, 1938

2,105,767

UNITED STATES PATENT OFFICE 2,105,767

PROCESS OF REMOVING COATING FROM CONTAINERS

Fredrick Gettelman, Milwaukee, Wis.

Application August 20, 1934, Serial No. 740,662

9 Claims. (Cl. 141—6)

This invention relates to a process of removing coating from containers. This case is a continuation in part of my parent Patent 2,071,621, granted February 23, 1937, and entitled Beer barrels. Some of the subject matter herein claimed is divisional from said parent application. The present invention, while applicable to containers generally, has particular reference to barrels used in the brewing industry, and it will be exemplified by a description of the process as applied to barrels.

It is difficult to remove coatings and apply new coatings to barrels. The present invention is concerned with methods used for the removal of old coatings. Where the coating is metallic it is seldom necessary to remove the old coating, but that phase of the invention having to do with the application of a new coating is particularly important in connection with the application of metallic coatings. Both the removal and the renewal phases of the invention are of great importance in connection with non-metallic coatings, such as pitch or composition coatings commonly used in barrels for beer.

The development of a metallic container for beer involved many ancillary problems as to suitable coatings. In the past wooden barrels have been quite universally used for beer, and the compositions used for coatings could readily be removed and replaced in a wooden barrel.

It proved to be very difficult, however, to properly coat a steel barrel. Coatings of porcelain or the like tended to crack in the normal use of the barrel. Metallic coatings could not readily be applied with uniformity because of the small openings in the conventional barrel. Many persons in the brewing industry further objected to any contact between the beer and a metallic coating of any kind.

Pitch and other compositions had to be specially modified for use in metal barrels to be adherent to the metal without cracking, chipping or running. When suitable adherent compositions were found and used it proved to be very difficult to remove and replace these compositions in the usual re-conditioning of the barrel between periods of use. If the barrel was heated to a point sufficiently to make the composition flow from its surfaces the composition would char. Its melting point was above that at which steam could dependably be used.

The present invention contemplates the removal of any coating, whether metallic or non-metallic, by filling the barrel with a liquid sufficiently hot to melt the coating and of such a character as to be immiscible with the melted coating material.

Other objects and advantages of the present invention will appear from the description and drawing thereof.

In the drawing.

Like parts are identified by the same reference characters throughout the several views.

Figure 1:
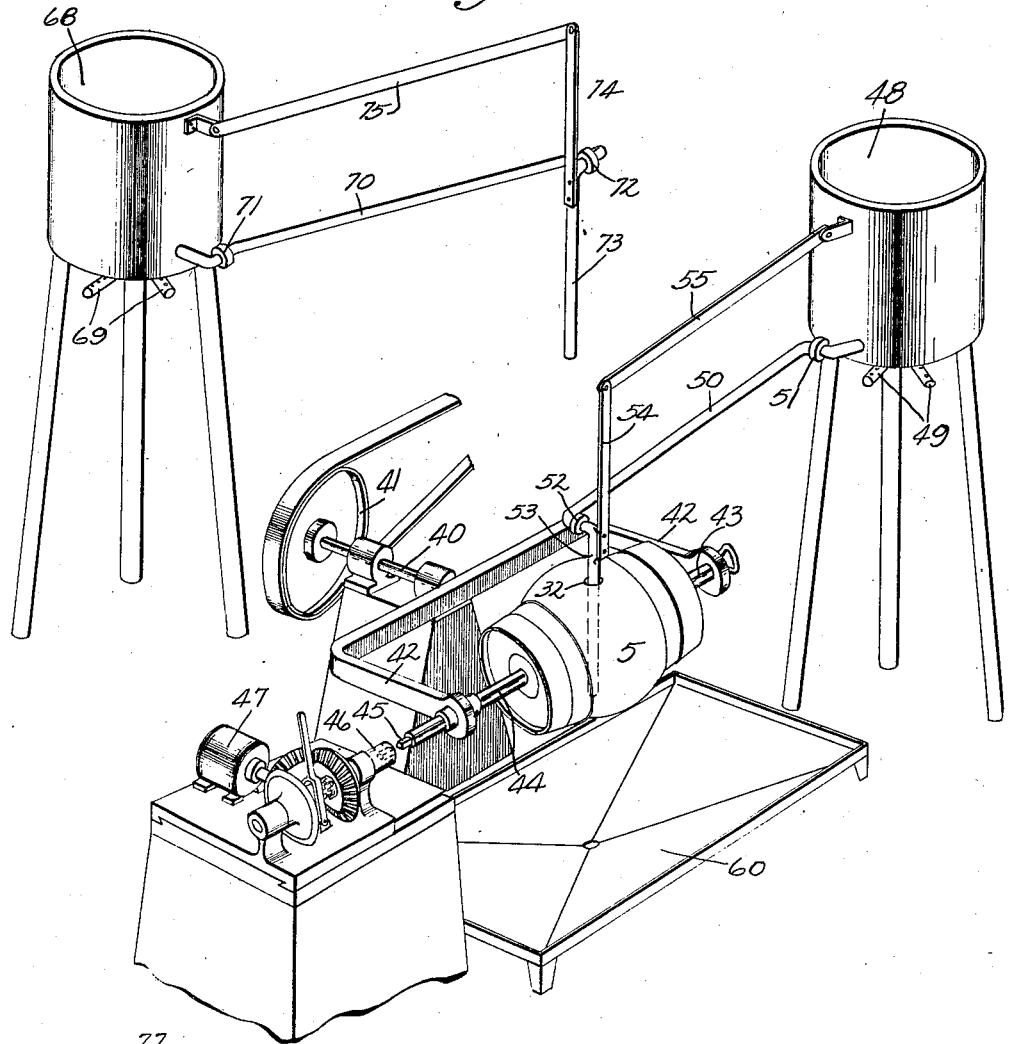
Figure 1 is a diagrammatic view in perspective showing one form of apparatus by which the invention herein disclosed may be practiced.

It will, of course, be understood that the apparatus disclosed is merely suggestive. The barrel 5 is shown in Figure 1 to be mounted in a frame bodily rotatable by means of shaft 40 and pulley 41 and comprising arms 42 which support a retractible tailstock 43 and a headstock 44 between which the barrel 5 is releasably engaged. The headstock has a squared end 45 which may be coupled, when desired, with a chuck 46 driven by motor 47, either directly or through conventional reverse gearing as shown.

The tank 48 contains material, preferably maintained in molten condition by means of the burner 49. From this tank the molten material may be discharged into the barrel through a pipe 50 having swivelled connection at 51 with the tank and a swivelled connection at 52 with a nozzle 53 which is centered to enter the bung hole 32 of the barrel. The nozzle 53 may be kept vertical in its upward and downward reciprocation at the end of pipe 50 by means of an extension 54 connected by link 55 with the upper part of tank 48 for parallel movement.

Beneath the barrel is a sump 60 into which the contents of the barrel may be discharged when the nozzle 53 is withdrawn and the barrel inverted from the position in which it is shown in Figure 1.

A second tank 68, heated by burner 69, is preferably employed. A similar pipe 70, having swivel connections at 71 and 72, is used to supply a barrel filling nozzle 73 and kept vertical by the extension arm 74 and link 75.

The process of re-coating the barrel is as follows:

The barrel 5 may be assumed to be a metal barrel having a composition coating of high melting point, which must be removed and replaced to re-condition the barrel for further use.

The barrel being mounted on the head and tailstock 43 and 44, as shown in Figure 1, the nozzle 53 is lowered into the bung hole 32 in order to introduce into the barrel from tank 48 a liquid which is not a solvent for the coating material and which has a temperature in excess of the melting point of such material. If the barrel had a metallic coating which it was necessary to remove, the liquid used would almost of necessity be another metal incapable of mixing or alloying itself with the metal comprising the coating. Assuming that the coating is a composition containing pitch or tar, or similar ingredients, a convenient liquid used in the removal process might be lead, solder, tin, white metal, or any metallic or non-metallic liquid capable of being heated to a temperature in excess of that required to melt the coating. Lead is a suitable and inexpensive material. Tin may also be used conveniently, since there is no appreciable waste of the material used.

The material may be allowed to flow into the barrel in sufficient quantities to fill it, in which case the composition coating will be floated from the sides of the barrel and will overflow from the bung hole as the barrel fills.

Or, as an alternative method, the barrel may be partially filled with the lead or other hot liquid and then turned on shaft 40, or by means of chuck 46 (or both) to scour all of the interior surfaces of the barrel with the hot fluid material, following which the barrel may be inverted from the position shown in Figure 1 and dumped through its bung hole into the catch basin 60.

In any event, the entire contents of the barrel, including the hot cleaning fluid and the melted coating, are ultimately dumped into the container 60, where the coating fluid and the scouring fluid will be collected and taken to a suitable point at which the coating fluid may be skimmed from the scouring fluid, and both may be reconditioned for further use.

Figure 2:
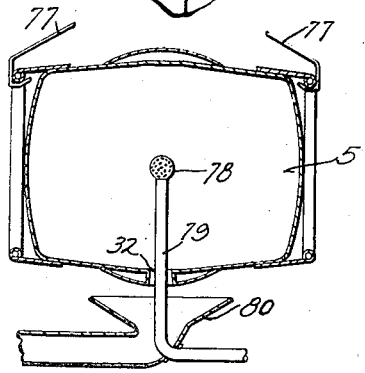
Figure 2 is a detail view showing a barrel in cross section and illustrating a modified form of practicing the invention.

The apparatus shown in Figure 2 may also be used for the removal of the coating. In this instance the barrel 5 is suspended by means of a suitable sling or tongs 77 enabling the barrel to have a certain freedom of manipulation in the hands of the operator. The barrel thus supported is lowered over a nozzle head 78 supplied with the scouring fluid (hot lead or the like), under pressure through a pipe 79 which enters the barrel through the inverted bung 32. As the hot material is sprayed from nozzle 78 and the barrel 5 is moved about on its supporting sling 77, the jets of hot scouring fluid will impact all portions of the interior of the barrel and will wash the coating therefrom, the coating and scouring fluid both being discharged through the bung 32 into hopper 80.

No means of pickling or otherwise cleaning the interior surface of the barrel for the application of a new coating is shown, such means being well-known. The coating material is contained in the tank 68, whence it may be discharged into the barrel through pipe 73 in the same manner in which the scouring fluid is introduced as above explained. The apparatus shown in Figure 2 may also be used for re-coating, if desired, the coating material being supplied under pressure through the nozzle 78, and the excess material allowed to drain off.

I have found, however, that it is extremely desirable to have a wiping or scouring action between the coating material and the surface to be coated in order to ensure the adequate coating of all surfaces, including the spots or areas which would otherwise refuse to take a coating.

One of the best means of achieving this result in the case of a container like a barrel is to discharge through nozzle 73 into the barrel a sufficient quantity of coating fluid and a substantial excess, the barrel thereafter being rotated either on the axis of shaft 40 or forward or reverse on its own axis through the means of chuck 46 and the reverse gearing. Rotation of the barrel on its own axis may be accomplished with the barrel substantially balanced in the head and tailstock so that high speeds of relative movement between the barrel and its contents may be achieved to produce the wiping, rubbing or scouring action between the coating material and the barrel surfaces which is best calculated to ensure a thorough coating. Any surplus of coating material may be dumped into the sump 60, or caught in the hopper 80, to be restored to the melting receptacle.

The method preferred is that in which the old coating is removed by a pure flotation process, the molten metal being allowed to fill the barrel until all of the melted coating is displaced therefrom. This process inherently excludes air from such coating particles as are in process of melting, charring being thereby prevented. The preferred process of coating the barrel is one in which a quantity of coating material is placed in the barrel and the barrel is rotated on its axis at a high speed with respect to the contained material.

I claim:

1. That process step which consists in removing a coating having a high melting point from the interior of a container by treating said coating with a non-aqueous liquid immiscible with said coating, and at a temperature in excess of the boiling point of water and of the melting point of the coating.

2. That process step which includes the removal of a composition coating from the interior of a container by treating said coating with a molten metal having a temperature exceeding the melting point of the coating and immiscible therewith.

3. That process step which consists in removing a solid coating from the interior of a container by floating said coating from the container upon an immiscible liquid of greater specific gravity than the coating, said liquid completely filling the container and having a temperature exceeding the melting point of the coating and materially higher than the boiling point of water.

4. That process step which includes the removal of a solid coating from a container having an opening by positioning the container with its opening uppermost and completely filling the interior of the container with a liquid material immiscible with the coating and having a greater specific gravity than the coating and a temperature in excess of the melting point of the coating and greatly exceeding the boiling point of water, said opening being left open whereby to float said coating from the container.

5. That step which comprises the removal of a composition coating from a container by completely filling the interior of the container with a molten metal and overflowing the melted coating therefrom.

6. Those steps in the removal of coating from a container which consists in spraying about the interior surfaces of the inverted container a liquid metal at a temperature in excess of the melting point of the coating, collecting said metal and the molten coating as they issue from the inverted container, and separating such metal and coating for re-use.

7. The process of removing a coating from a barrel which consists in discharging molten metal into the barrel, discharging the molten coating and the molten metal from the barrel and separating the coating and the metal.

8. The process of removing the coating from barrels which consists in the repeated introduction into successive barrels of a sufficient quantity of molten metal to melt the coating therefrom, and the separation of the coating material from the molten metal.

9. The process of removing a composition coating from a series of barrels, which process consists in introducing into each successive barrel a quantity of molten metal sufficient to fill the barrel, floating the molten composition material from the barrel upon the molten metal, and separating the composition material from the metal for the use of the metal on a successive barrel.

FREDRICK GETTELMAN.